Nov. 23, 1965    W. H. FOLLETT    3,219,843
TEMPERATURE TRANSDUCER
Filed Oct. 24, 1962    2 Sheets-Sheet 1

INVENTOR
*WILLIAM H. FOLLETT*

BY  *Duane C. Burton*

United States Patent Office 3,219,843
Patented Nov. 23, 1965

3,219,843
TEMPERATURE TRANSDUCER
William H. Follett, Boulder, Colo., assignor to Ball Brothers Research Corporation, Boulder, Colo., a corporation of Colorado
Filed Oct. 24, 1962, Ser. No. 232,687
1 Claim. (Cl. 307—88.5)

This invention relates generally to temperature transducers and more particularly to a compact, light weight, reliable device that provides an electrical signal proportional to the temperature.

Previous efforts to provide a light weight, reliable temperature transducer which is simple in design and which can produce an electrical signal of sufficient strength such that further amplification is unnecessary; e.g., most telemetry systems use zero to five volts as the dynamic range, have not been completely satisfactory. For example, a thermistor used in combination with a semiconductor element has been found to be generally unsatisfactory since the thermistor is not time stable, the circuit in which it is used requires the incorporation of a compensated D.C. amplifier to amplify the resulting signal to a useable power level, and the resulting signal is non-linear or not generally proportional to the temperature measured. It has been discovered, however, that an uncompensated transistorized D.C. amplifier powered with a regulated voltage and weighing about 6 grams is time stable and can generate a reasonably linear voltage vs. temperature curve, the amount of voltage generated for most applications being of sufficient value as to preclude the need of any further amplification thereof.

Accordingly, the primary purpose of this invention is to provide a compact, light weight, reliable temperature transducer which generates a signal which is generally proportional to the temperature.

Another object of this invention is to provide a temperature transducer comprising an uncompensated transistorized D.C. amplifier.

Another object of this invention is to provide a light weight, reliable temperature transducer capable of generating an electrical signal substantially proportional to the ambient temperature of the transducer and in the range between zero to approximately the collector-emitter breakdown voltage of the selected transistor.

Another object of this invention is to provide a temperature transducer having a temperature dynamic range substantially independent of the end point.

The foregoing and other objects and advantages will become apparent from the specifications and drawings in which.

Figure 2:
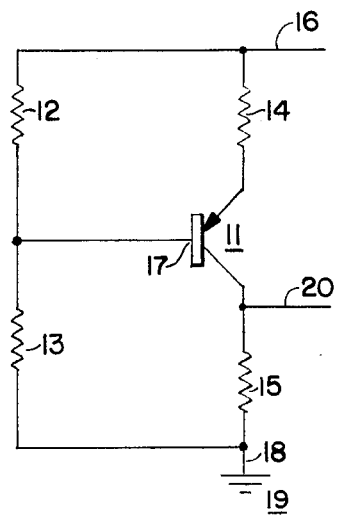
FIGURE 2 is a schematic wiring diagram of the transducer shown in FIGURE 1 comprising a PNP transistor.
Figure 4:
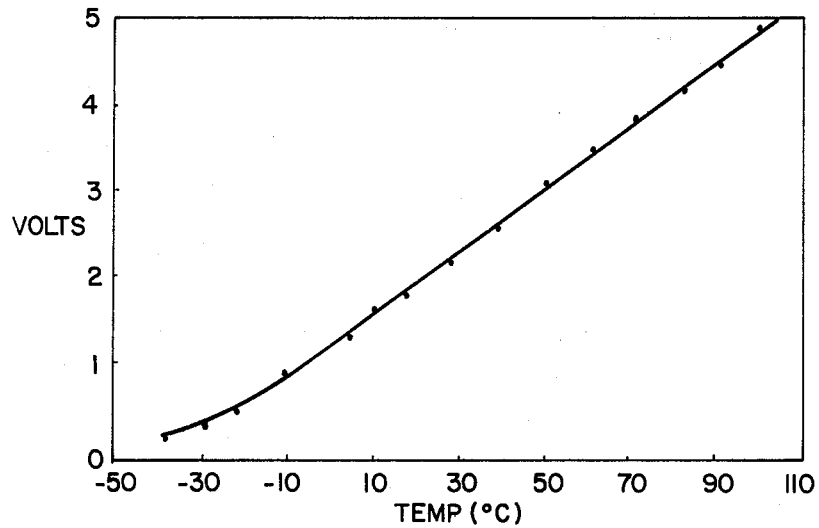
Figure 5:
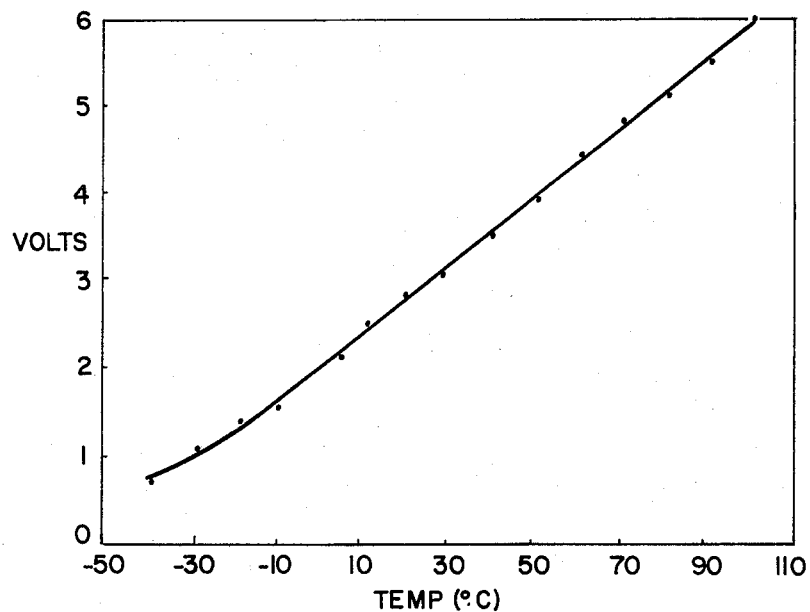

FIGURE 4 is a representative graph showing the value relationship between the signal generated by the temperature transducer shown in FIGURE 2 and the ambient temperature of said transducer; and FIGURE 5 is a representative graph showing the value relationship between the signal generated by a temperature transducer constructed in accordance with this invention and the environmental temperature of said transducer.

Figure 1:
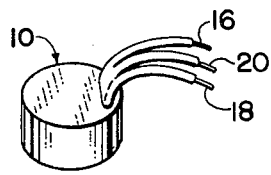
FIGURE 1 is a perspective view of a temperature transducer constructed in accordance with this invention.

Referring now to the drawings, in FIGURE 1 is shown a temperature transducer 10 that utilizes the base-emitter voltage change with temperature, such as a planar process silicon transistor, to produce a signal which is indicative of the environmental temperature of the transistor. In FIGURE 2 the circuitry for such a transducer is shown comprising a PNP transistor 11 and four resistors, 12, 13, 14, and 15. The transducer 10 is connected by a wire 16 to a source of regulated D.C. voltage (not shown) in a manner such that the base 17 of the transistor 11 is held at a constant voltage by a voltage divider formed by resistors 12 and 13. The transducer is connected through a wire 18 to a ground 19; the voltage output which is positive with respect to ground is transmitted to an appropriate voltage indicating means (not shown) through a wire 20. If resistor 15 is replaced by a low resistance meter, the output of the transducer will be indicated in current rather than in volts.

Where the base of the transistor is held at a constant voltage by a voltage divider, the current through the transistor is $$I^c = \frac{(V_b - V_{eb})\alpha}{r_e + R_{14}} \quad (1)$$

where:
$V_b$ is the base voltage set by the base biasing resistors 12 and 13,
$V_{eb}$ is the base-emitter voltage,
$r_e$ is the transistor emitter resistance,
$R_{14}$ is value of resistor 14, and
$\alpha$ is a constant, the value of which is dependent upon the characteristic of the transistor used.

From Equation 1 it can be seen that the temperature at which current starts to flow through the transistor is that temperature where $V_b = V_{eb}$. Consequently, in order to design a temperature transducer, the cold point temperature is preferably selected first. After the cold point temperature has been selected, the value of $V_{eb}$ at the cold point temperature is determined. For most PNP transistors $V_{eb}$ has a temperature coefficient between —1.83 and —1.94 mv./° C., however, all silicon transistors have coefficients of about —2 mv./° C. Therefore, if a cold point temperature of —30° C. is used in the calculation, the value of $V_{eb}$ for a silicon transistor is (2)
$V_{eb} = 0.61$ v. — (0.002 v./°C.) ($T$° C. —20° C.)
$= 0.61 - (0.002$ v./° C.)(—30° C. —20° C.) $= 0.71$ volt where $V_{eb}$ at 20° C. equals 0.61 volt and a temperature coefficient of —2 mv./° C. is assumed.

With the value of $V_{eb}$ established, the values of resistors 12 and 13 are then selected to furnish 0.71 volt to the base of the transistor. By careful selection of the values of the resistors 12 and 13, the base current is held to a small part of the current in the resistors 12 and 13; however, at the same time, the values of the resistors must be sufficiently large such that the transducer will not require any more current than necessary. A selection of a value of 25 K ohms for $R_{12} + R_{13}$ results in a low power requirement for the transducer and holds the base current to a small portion of the current in $R_{12}$ and $R_{13}$. When the current through the base of the transistor is a small part of the current flowing through the resistors 12 and 13 it may be assumed that $V_b$ is approximately equal to $$V_{cc}\frac{R_{12}}{R_{12}+R_{13}}$$

where $V_{cc}$ is equal to the value of the regulated D.C. voltage. Since $R_{13}$ is usually much larger than $R_{12}$, the expression may be reduced to $$V_b = V_{cc}\frac{R_{12}}{R_{13}} \quad (3)$$

Thus, the ratio of $R_{12}$ to $R_{13}$ may be assumed to be approximately equal to the ratio of $V_b$ to $V_{cc}$.

The value for the resistor 15 is selected to insure that the transistor does not become saturated and to establish the range of the transducer's voltage output values. Saturation of the transistor is undesirable since the transistor is thereby rendered inoperable. With a given resistor 14, the smaller the values of $R_{15}$, the smaller the transducer's voltage output; also the larger the value of $R_{15}$, the larger the values of the transducer's voltage output. The value selected for resistor 15 will therefore depend upon the operating requirements of the transducer; however, the value selected will not affect the temperature range, or the end points of the transducer as long as the output voltage, $I_cR_{15}$, does not reach $V_{cc}-V_b$, i.e., the collector to emitter voltage must be maintained at a value greater than zero.

The temperature range is selected to meet the requirements of a particular situation. Once the temperature range has been established, the gain in current per degree is found differentiating the current with respect to $V_{eb}$. Thus, by differentiating Equation 1 and neglecting the effects of $r_e$, the slope of the current vs. temperature curve is found to be $$\frac{dI_c}{dV_{eb}} = \frac{\alpha}{R_{14}}$$

or by using the temperature coefficient for silicon transistors of about $-2$ mv./° C.

$$\frac{dI_c}{dT} = \frac{0.002\alpha}{R_{14}} \quad (4)$$

since $dV_{eb}/dT$ equals $-0.002$. In Equation 4 $dT$ is the change in temperature measured in degrees centigrade. By substituting the expression $dI=dV_0/R$ in Equation 4, the result is $$\frac{dV_0}{dT} = \frac{0.002R_{15}\alpha}{R_{14}} \quad (5)$$

$R_{14}$ is found by using either Equation 4 or Equation 5.

As can be seen in FIGURES 4 and 5, at the low voltage end of the curve the slope becomes less than $0.002 \alpha/R_{14}$. This is due to $r_e$ becoming equal to $R_{14}$ at low voltage values, since $r_e$ increases rapidly as the current becomes quite small. By selecting a small value for $R_{15}$ the current becomes quite small, except for introducing non-linearities this is not serious since $r_e$ is a time stable parameter.

In designing a temperature transducer in accordance with this invention, the value of the regulated D.C. voltage, the desired range of voltage output, the maximum operating current, the end cold point temperature and the temperature range are chosen. The value of $R_{15}$ is found by dividing the upper limit of the desired voltage range by the maximum operating current. For example, with a desired voltage range of zero to five volts and a maximum operating current of 0.5 milliampere $$R_{15} = 5 \text{ volts}/0.5 \text{ ma} = 10K \text{ ohms}$$

Once the cold point temperature and the temperature range has been selected, $V_b$, which equals $V_{eb}$ at the cold point temperature, may be calculated from Equation 2. Following the determination of $V_b$, the values for $R_{12}$ and $R_{13}$ may be ascertained. However, for the purpose of making the necessary calculations the actual cold point temperature is increased an amount varying from five to fifteen percent of the temperature range and normally about ten percent thereof in order to compensate for the non-linearity occurring at the low current values. Therefore, with an actual cold point temperature of $-30°$ C., i.e., where the voltage output will be substantially zero, and a temperature range of $130°$ C., a cold point temperature of approximately $-30°$ C. plus ten percent of the temperature range or $-17°$ C. will be used in the calculations. From Equations 2 and 3 where $V_{eb}$ at $20°$ C. equals 0.61, a temperature coefficient of $-2$ mv./° C. is assumed and $V_{cc}$ equals 15 volts, it is found that $R_{12}/R_{13}$ is approximately equal to 0.0449 and that $R_{13}$ is about twenty-two times larger than $R_{12}$. Since the value for $R_{12}+R_{13}$ is determined by the criteria of maintaining low power requirements for the transducer and holding the base current to a small portion of the current in $R_{12}+R_{13}$, suitable values for $R_{12}$ and $R_{13}$ are found to be 1,000 ohms and 22,000 ohms, respectively.

From the Equation 5 where $\alpha$ is assumed to be equal to one, $R_{14}$ is found to be 468 ohms. Upon the ascertainment of the value for resistor 14, all the requisite information needed to complete the design of a complete temperature transducer is available and a transducer may be constructed in accordance therewith.

Figure 3:
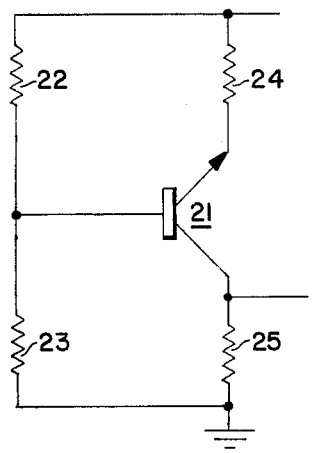
FIGURE 3 is a schematic wiring diagram of a transducer comprising an NPN transistor.

In FIGURE 3 is shown a temperature transducer similar to that shown in FIGURE 2 except that an NPN transistor 21 is used in lieu of PNP transistor and the voltage output is negative with respect to ground. Otherwise, resistors 22, 23, 24 and 25 and the design criteria therefore are the same as resistors 12, 13, 14 and 15 shown in FIGURE 2.

Transducers constructed in accordance with the instant invention have been used in various applications. The data in Table 1 was obtained from transducers made from the transistor and resistors as shown in Table 2 below:

*Table 1*

| Temperature, ° C. | Temperature transducer A, volts | Temperature transducer B, volts |
| --- | --- | --- |
| 100 | 4.836 | 6.001 |
| 90.5 | 4.502 | 5.658 |
| 81.5 | 4.172 | 5.308 |
| 71 | 3.795 | 4.915 |
| 62 | 3.446 | 4.565 |
| 50.5 | 2.992 | 4.075 |
| 40 | 2.635 | 3.707 |
| 28.5 | 2.221 | 3.224 |
| 19 | 1.864 | 2.854 |
| 11 | 1.585 | 2.519 |
| 0.7 | 1.237 | 2.123 |
| -10 | 0.912 | 1.760 |
| -19 | 0.640 | 1.407 |
| -28.5 | 0.404 | 1.078 |
| -38 | 0.217 | 0.768 |

*Table 2*

|  | Transducer A | Transducer B |
| --- | --- | --- |
| Transistor | Fairchild, FM 1132 | Fairchild FM 1132. |
| $R_{12}$ | 1K, 1%, 1/10 w., carbon film. | 1.1K, 1%, 1/10 w., carbon film. |
| $R_{13}$ | 21.5K, 1%, 1/10 w., carbon film. | 21.5K, 1%, 1/10 w., carbon film. |
| $R_{14}$ | 383Ω, 1%, 1/10 w., carbon film. | 383Ω, 1%, 1/10 w., carbon film. |
| $R_{15}$ | 10K, 1%, 1/10 w., carbon film. | 10K, 1%, 1/10 w., carbon film. |
| Regulated voltage (volts). | +15.0±150 mv. | +15.0±150 mv. |
| Temperature range (° C.). | -50° to +100° | -70° to +70°. |

The voltage vs. temperature curve obtained with transducer A in Table 1 is shown in FIGURE 4; the voltage vs. temperature curve obtained with transducer B in Table 1 is shown in FIGURE 5.

From the foregoing, it will be apparent that the invention provides an extremely reliable, compact, light weight temperature transducer that produces a reasonably linear voltage or current vs. temperature curve which for most applications produces a signal of sufficient value so as to preclude the need for further amplification thereof.

It is to be understood that this invention is not limited to the exact embodiments of the device shown and described, which is merely by way of illustration and not apparent to those skilled in the art, and it is therefore intended that the appended claim cover all such changes and modifications.

What I claim is:

A temperature transducer comprising a transistor having an emitter electrode, a collector electrode and a base electrode, an emitter-base circuit including first and second resistors, a collector-base circuit including third and fourth resistors with their common junction connected to ground, said first and third resistors being arranged to provide a voltage divider and maintain said base electrode at a substantially constant voltage, power input means connected to said emitter base circuit between said first and second resistors, signal output means connected to said collector-base circuit between said fourth resistor and said collector electrode, said second resistor having a resistance value with respect to said fourth resistor according to the equation $$\frac{dV_0}{dT} = \frac{dV_{eb}\alpha}{dT} \times \frac{R_{(Fourth)}}{R_{(Second)}}$$

wherein $dV_{eb}/dT$ is the differential with respect to ambient temperature of the base emitter voltage, $\alpha$ is the D.C. amplification factor and $dV_0/dT$ is the response of the transducer to ambient temperature, whereby base-emitter voltage change with transistor temperature functions to produce in said output means a signal proportional to transistor temperature.

References Cited by the Examiner

UNITED STATES PATENTS

| | | | |
|---|---|---|---|
| 2,929,025 | 3/1960 | Wilhelmsen | 330—23 X |
| 2,996,918 | 8/1961 | Hunter | 307—88.5 X |
| 3,082,130 | 3/1963 | Runyan | 317—235 |
| 3,102,425 | 9/1963 | Westman | 307—88.5 X |

FOREIGN PATENTS 605,397    9/1960    Canada.

ARTHUR GAUSS, *Primary Examiner.*

JOHN W. HUCKERT, *Examiner.*